(12) United States Patent
Kusanagi (10) Patent No.: US 8,121,003 B2
(45) Date of Patent: Feb. 21, 2012

(54) OPTICAL RECORDING/REPRODUCING APPARATUS

(75) Inventor: Suguru Kusanagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 495 days.

(21) Appl. No.: 12/390,754

(22) Filed: Feb. 23, 2009

(65) Prior Publication Data

US 2009/0213708 A1  Aug. 27, 2009

(30) Foreign Application Priority Data

Feb. 25, 2008  (JP) ................... 2008-043068

(51) Int. Cl.
*G11B 7/00* (2006.01)

(52) U.S. Cl. .............. 369/47.51; 369/47.55; 369/116; 369/53.26

(58) Field of Classification Search .............. None
See application file for complete search history.

(56) References Cited

U.S. PATENT DOCUMENTS

2004/0037190 A1* 2/2004 Suzuki et al. .......... 369/47.51
2006/0280079 A1* 12/2006 Cho et al. ............. 369/47.53

FOREIGN PATENT DOCUMENTS

| JP | 7-244930 | 9/1995 |
|----|----------|--------|
| JP | 2006-54051 | 2/2006 |

* cited by examiner

*Primary Examiner* — Jorge L Ortiz Criado (74) *Attorney, Agent, or Firm* — Fitzpatrick, Cella, Harper & Scinto (57) ABSTRACT

The present invention provides an optical recording/reproducing apparatus which can record information on the whole plane of the optical disk with a stable quality, even when the temperature has largely changed during a recording standby period in an intermittent recording process. The present optical recording/reproducing apparatus reproduces the information from a recorded portion on which the information has been already recorded, to evaluate the signal quality of the reproduced information, and simultaneously detects a temperature in the apparatus to correct a recording power of a laser beam when restarting the recording, on the basis of the evaluation result and the detected temperature in the apparatus, during the recording standby period in the intermittent recording process.

5 Claims, 5 Drawing Sheets

OPTICAL RECORDING/REPRODUCING APPARATUS

BACKGROUND OF THE INVENTION

1. Field of the Invention

The present invention relates to an optical recording/reproducing apparatus which records or reproduces information on or from an information recording medium such as an optical disk, and particularly relates to adjustment of a laser power during recording.

2. Description of the Related Art

An optical recording/reproducing apparatus is mainly used as a peripheral device of a personal computer or the like, and has been developed as high-capacity data storage equipment due to easy-portability and a low price of the medium. In particular, the optical recording/reproducing apparatus has such data accessibility advantageousness as to be capable of intermittently recording a continuous data and reproducing an arbitrary part of the continuous data at a high speed at random, which cannot be realized by a tape-shaped recording medium.

Now, the optical recording/reproducing apparatus further progresses so as to cope with the tendency of higher density and increase the speed of the transfer rate, and has an open application field in a digital recording/reproducing apparatus with high-definition image information, as leading multimedia equipment.

Thus, in the optical recording/reproducing apparatus having attained high speed and high density, it is very important to optimally adjust a recording power of a laser beam in the record or reproduction of the data. The optimum recording power is affected by a track width, a pitch, a groove shape, the sensitivity of a material of a dye layer, the uniformity of the dye layer in a radius direction and the like in an optical disk (medium).

Generally, such an individual difference among disks is specific to each optical disk, and the optimum recording power changes depending on the optical disk. Even in the same optical disk, the optimum recording power changes along with time, being caused by a warp of an optical disk, a dirt on an optical disk and an increase in the usage count, and depending on how an optical disk is kept. Thus, the effective value of the recording power changes, and then the optimum value of the recording power varies. In a process of recording/reproducing these optical disks, the optimum recording power or the optimum reproduction power may change due to the change of temperature in the apparatus, depending on a use environment.

For this reason, Japanese Patent Application Laid-Open No. H07-244930 proposes a technique of reproducing a region which has recorded immediately before, during a pausing period in intermittent recording, and correcting the recording power in accordance with the obtained reproduced signal, as a method of correcting the recording power in accordance with a difference of characteristics in a radius direction of the optical disk and the temperature change during recording.

However, when the technique is used in a recording device such as a DVD recorder or a video camcorder, a recording standby period is occasionally prolonged by the pause operation. Then, the temperature can largely change in the recording standby period. The conventional method described in the above described patent document sets the recording power at the optimum recording power for the temperature at previous recording, so that the optimum recording power results in being different from the previously set optimum recording power, when the temperature largely changes before the recording apparatus restarts recording.

SUMMARY OF THE INVENTION

It is a scope of the present invention to realize the recording of stable quality on the whole face of the optical disk, by making an apparatus restart recording with a correct recording power even when the temperature has largely changed in the recording standby period.

In order to solve the above described problems, the present invention provides the following apparatus.

According to an aspect of the present invention, an optical recording/reproducing apparatus for intermittently recording information on an optical disk, comprises: a light source used for recording the information on the optical disk, a sensor for reproducing the information from a recorded portion on which the information has been already recorded and evaluating signal quality of the reproduced information, during a recording standby period in the intermittent recording; a sensor for detecting a temperature in the apparatus; and a circuit for correcting a power of a laser beam emitted from the light source, on the basis of the evaluation result and the detected temperature in the apparatus, wherein the correction circuit corrects the power of the light source on the basis of the evaluation result, and further corrects the corrected power of the laser beam on the basis of temperature differences among a plurality of temperatures in the apparatus, which have been measured at the plurality of timings in the recording standby period.

Further features of the present invention will become apparent from the following description of exemplary embodiments with reference to the attached drawings.

DESCRIPTION OF THE EMBODIMENTS

Exemplary embodiments of the present invention will now be described below with reference to the drawings.

Figure 1:
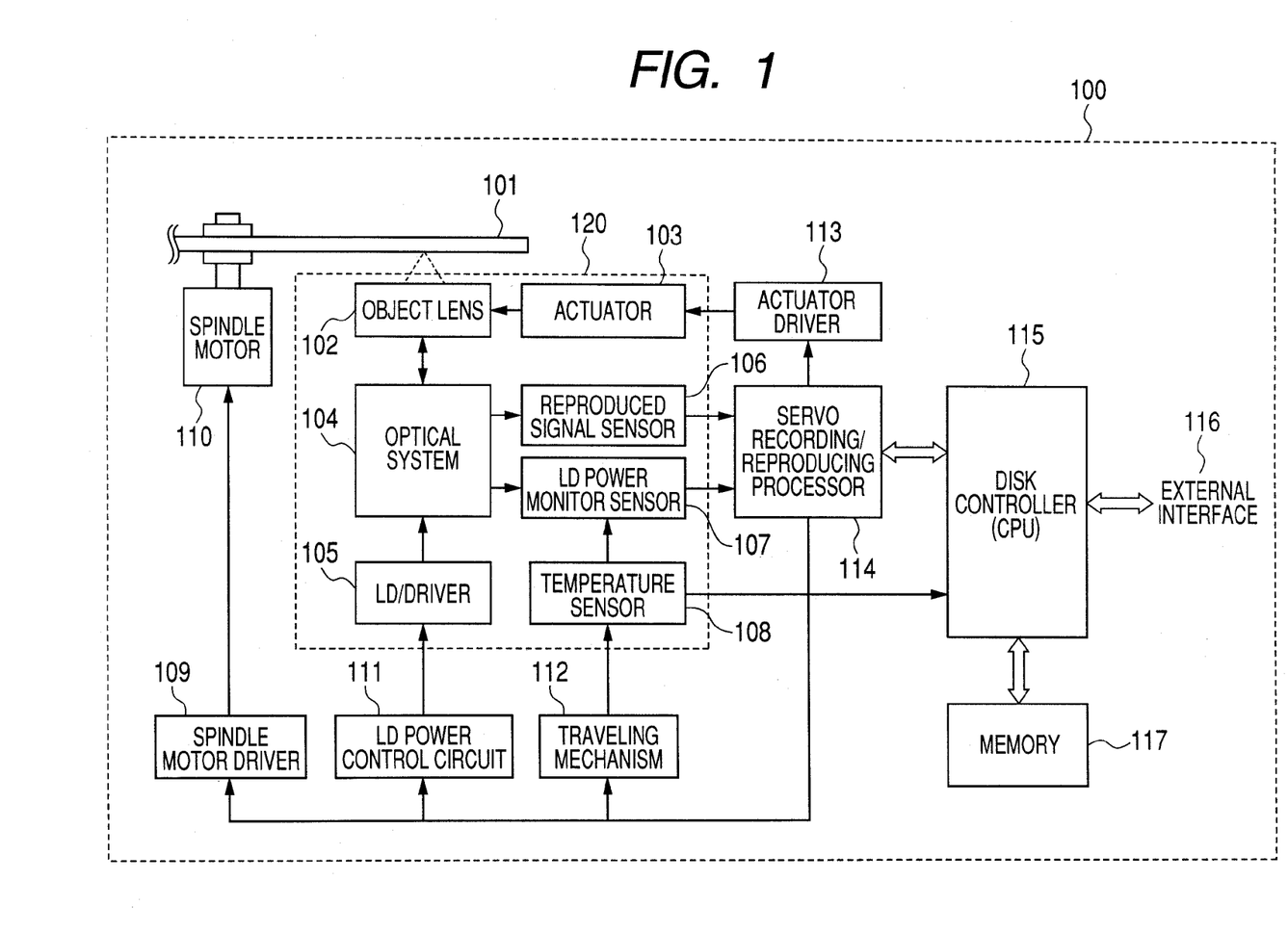
FIG. 1 is a functional block diagram of an optical recording/reproducing apparatus.

A method of adjusting a recording power according to the present invention is applied to an optical recording/reproducing apparatus 100 as illustrated in FIG. 1, for instance. The recording power described in this specification means the intensity of a light beam (laser beam) emitted, during a recording time period, from a light source which will be described later.

Component and a series of actions of optical recording/reproducing apparatus 100

The optical recording/reproducing apparatus 100 includes an optical disk (hereinafter referred to as "disk") 101 which is a disk-shaped recording medium, an optical pickup (hereinafter referred to as "OPU") 120, and a spindle motor (hereinafter referred to as "SPM") 110. The optical recording/reproducing apparatus 100 further includes a spindle motor driver (hereinafter referred to as "SPM driver") 109, an LD power control circuit 111 (Here, LD is an abbreviation of laser diode, and in other words, is light source, hereinafter the same.), an actuator driver 113, a traveling mechanism 112, a servo recording/reproducing processor 114, and a disk controller (CPU) 115.

The whole configuration of FIG. 1 and the basic action will now be described below.

The disk controller 115 includes CPU (central processing unit). The disk controller 115 controls the action of the whole optical recording/reproducing apparatus 100 by executing a user instruction command or a predetermined program ordered from an unshown operation system through an external interface 116.

The action of recording or reproducing information on or from the disk is controlled in a well-known shock proof (intermittent driving) process through a memory 117.

The disk 101 is a write-once type disk which has, for instance, an organic dye provided in a recording layer. In the write-once type disk, an intense light beam which has irradiated the disk in a recording time is absorbed in a dye layer to thermally change the property of the dye, and thereby changes the reflectance of the medium. The disk of this type can record information thereon only once, but has high reproduction compatibility of a player, is comparatively inexpensive, so that a demand for the disk of this type is now in rapidly increasing.

Next, a servo recording/reproducing treatment with the use of the disk controller 115 and the servo recording/reproducing processor 114 will now be described below.

The processor 114 controls the rotation drive of the SPM 110 through the SPM driver 109. Here, the rotation of the spindle motor is controlled with a so-called CLV (Constant Linear Velocity; constant line velocity) method. The disk 101 has a zigzag side wall which is referred to as a "wobble" formed therein along a track groove. The rotation speed of the disk is controlled so that the frequency of the detected wobble signal can match with a target value.

An OPU 120 is constituted by an object lens 102, an actuator 103, an optical system 104, an LD/driver 105, a reproduced signal sensor 106, an LD power monitor sensor 107 and a temperature sensor 108. The apparatus has a temperature sensor 108 arranged in the vicinity of the light source. The temperature sensor 108 detects the temperature in the apparatus.

The OPU 120 is connected to the servo recording/reproducing processor 114, the spindle motor or the actuator driver 113 by a flexible cable or the like.

The LD/driver 105 includes a light source which is specifically a semiconductor laser element (hereinafter referred to as "LD"), and a laser driver. The laser light (laser beam) emitted from the light source (LD) irradiates the disk 101 through the optical system 104 and the object lens 102. The LD power monitor sensor 107 is constituted by a semiconductor light receiving sensor and a photoelectric conversion amplifier. A part of the laser beam emitted from the LD is detected by the LD power monitor sensor 107. The LD power monitor sensor 107, the servo recording/reproducing processor 114 and the LD power control circuit 111 constitute an APC (Auto Power Control) loop. In other words, the power emitted from the LD is feedback-controlled so that the output of the LD power monitor sensor matches with a target power which has been set by the disk controller 115.

Figure 2:
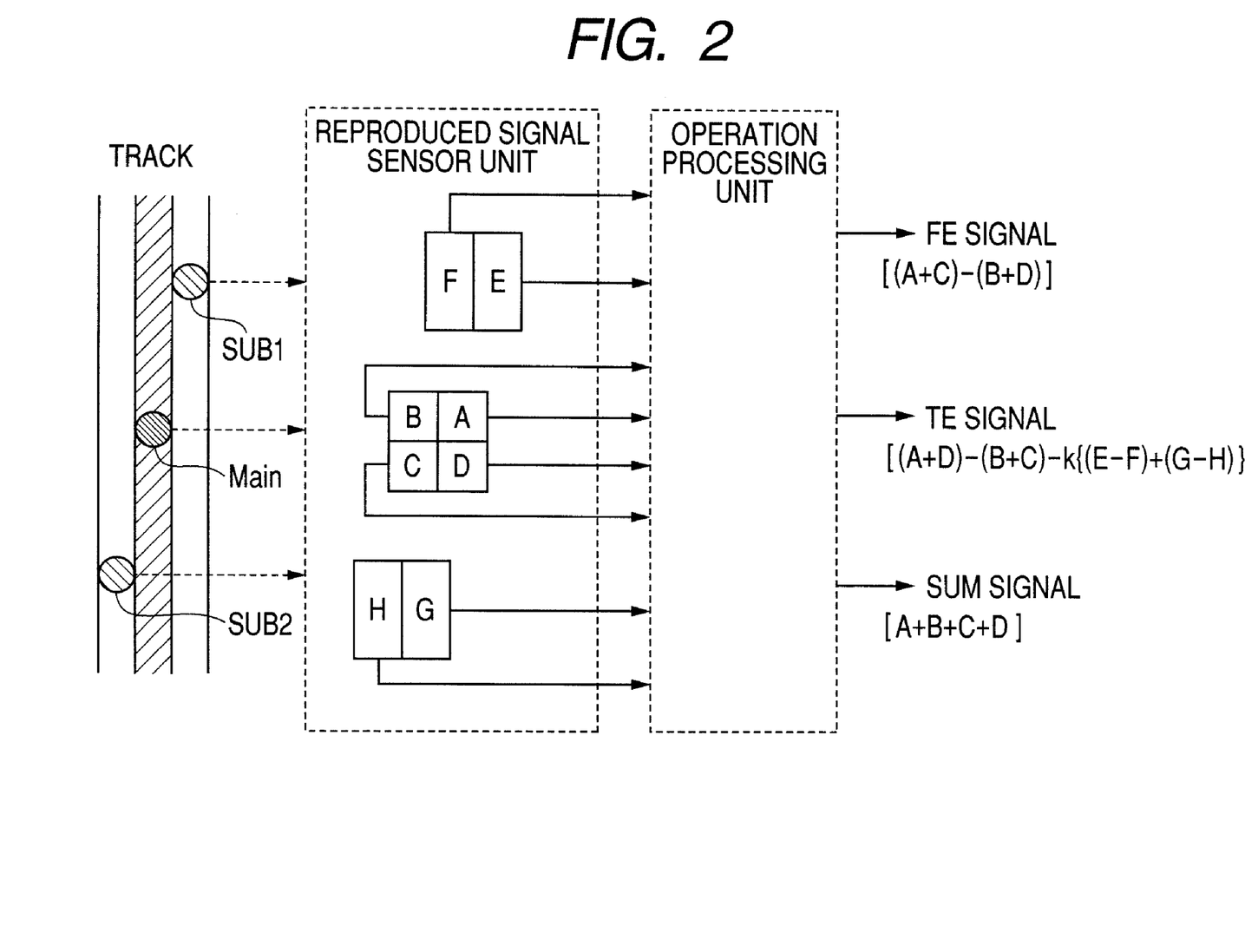
FIG. 2 is a view for describing an actuator control signal.

The reproduced signal sensor 106 is constituted by a semiconductor light receiving sensor and a photoelectric conversion amplifier. FIG. 2 illustrates light spots arranged on the disk, the configuration of the reproduced signal sensor, and an operation processing unit in the servo recording/reproducing processor.

In the figure, a main beam Main is controlled so as to be positioned in the center of the track. Sub beams SUB 1 and SUB 2 are controlled so as to be positioned in deviated positions by only ½ truck in a radius direction (Differential Push Pull method).

The reproduced signal sensor unit in FIG. 2 corresponds to each of three beams. The reflected light of the main beam Main irradiates a four-section divided sensor (A to D), and the reflected lights of the sub beams SUB 1 and SUB 2 irradiate a two-section divided sensors (E to F and G to H) respectively. The output of the reproduced signal sensor is transmitted to the operation processing unit of the servo recording/reproducing processor 114 from the OPU 120 through the flexible cable or the like. In the operation processing unit, respective channel signals of A to H are arithmetically processed through a gain control process (Auto Gain Control), a filter process (Pre Filter) and a digitization process (Analog/Digital Converter). Here, a SUM signal which is the sum of the reflected light of the main beam is arithmetically output as $$SUM = A+B+C+D.$$

In addition, the signal of the difference of the sum of diagonal sections of the four-section divided sensor is arithmetically output as a focus-error/FE signal of the main beam (astigmatism method).

$$FE = (A+C) - (B+D)$$

In addition, the push-pull signal of the main beam is obtained as a signal of $(A+D)-(B+C)$, but includes an offset originating in a shift of an object lens in radius direction of the disk. Then, the operation processing unit multiplies the push-pull component of the sub beam $(E-F)+(G-H)$ by the predetermined coefficient k, subjects the product to a difference operation, and produces a track-error/TE signal in which the offset component has been canceled.

$$TE = (A+D) - (B+C) - k\{(E-F) + (G-H)\}$$

The predetermined coefficient k is a constant that is determined according to the ratio of the divided light amounts of the main beam and the sub beam.

The focal position of a light beam spot is controlled (focus control) based on the focus-error/FE signal as described above. In addition, the track of the light beam spot is controlled on the basis of the tracking error/FE signal so that the light beam spot can follow the information track in a groove direction. The track of the light beam spot is controlled by a fine adjustment of the actuator 103 and a rough adjustment of the traveling mechanism 112. Specifically, when the position of the object lens is detected to be positioned at the end of the movable range of the actuator, the traveling mechanism 112 operates to transfer the whole OPU 120 to a radius direction of the disk. In this way, the light beam spot is controlled so as to follow a predetermined track of the disk, through the combination of the fine control by the actuator 103 and the transfer of the OPU 120 by the traveling mechanism 112. The traveling mechanism 112 transfers the OPU 120 to the radius direction of the disk (traverse control), and bears a seek operation for a predetermined address.

The digitalized reproduced signal subsequently acquires a clock synchronized with itself formed on the edge by an unshown PLL (Phase Locked Loop), and is subjected to data processing. The resultant reproduced signal is further subjected to a predetermined decoding process such as data detection by PRML (Partial-Response Maximum-Likelihood) and ECC (error correction; Error Correction Code).

On the other hand, as for recording onto the disk 101, the servo recording/reproducing processor 114 produces a recording pattern by modulation processing conforming to a disk format. The LD/driver 105 bears a so-called write strategy action of shaping the waveform of and controlling the timing of a pulse of a laser to be emitted, according to the recording pattern.

The disk controller 115 records a data in a shock proof action. Specifically, the disk controller 115 makes the OPU intermittently access the disk by using a difference between a rate (low speed) at which the data is input and output to the apparatus and a rate (high speed) at which the data is recorded on the disk. That is to say, the disk controller 115 keeps the disk access action of the OPU in a pausing state (recording standby) while the signal sent from the external interface 116 is stored in the memory 117. The pausing state means a state in which an LD that consumes much power is turned off and the action of a relating electric circuit block is stopped. When the predetermined amount of the data has been stored in the memory 117, the disk controller 115 makes the OPU start the disk access action and record the data which has been stored in the memory 117, onto the disk 101. When the recording on the disk has been completed, the disk controller 115 keeps the disk access action of the OPU in the pausing state again. Thus, the OPU intermittently executes the disk access action, so that the LD can be turned off in the pausing period and accordingly can reduce an average power consumption. In addition, even when vibration or impact is applied to the apparatus from the outside, the memory 117 plays a roll of a buffer, which enables the apparatus to execute servo return processing (retry processing), and accordingly gives the effect of enhancing vibration-proof reliability to the apparatus. The OPU is set at a pausing state during a pause action by a user operation other than the normal intermittent action. The intermittent recording action according to the present invention includes the pause action.

Flow for adjusting recording power of optical recording/reproducing apparatus 100

Figure 3:
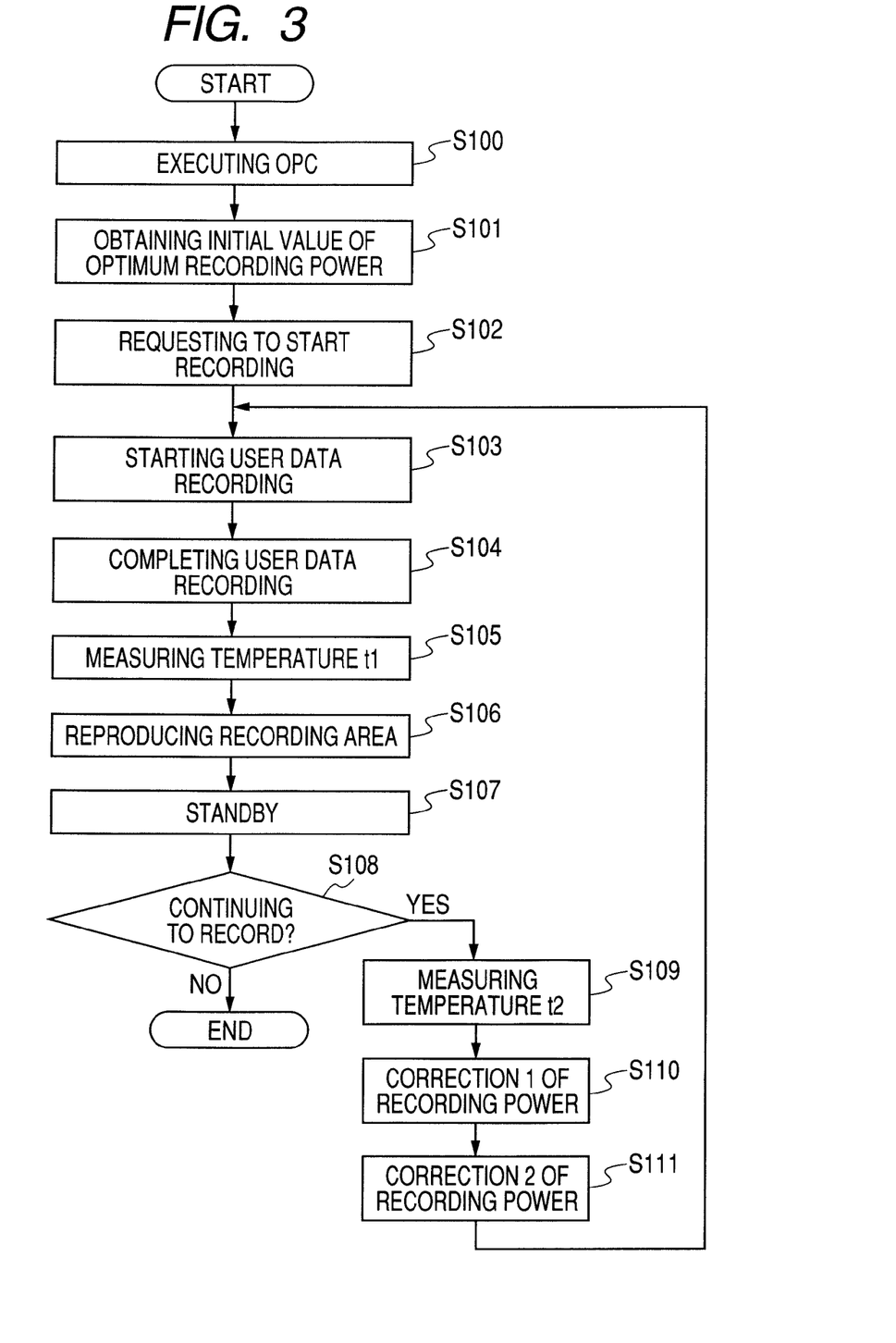
FIG. 3 is a flow chart illustrating an action according to a first embodiment of the present invention.

FIG. 3 is a flow chart for illustrating an operation of adjusting the recording power during an intermittent recording period according to the present invention. The specific adjustment flow will now be described below with reference to FIG. 3.

Firstly, the initial value of the optimum recording power for a disk 101 is determined. The disk controller 115 executes the OPC (Optimum Power Control) of determining the recording power based on a direction of an upper command. Specifically, the disk controller 115 transfers the OPU 120 to a predetermined region PCA (Power Calibration Area) in the disk 101, and executes a trial record and the evaluation of a reproduced signal.

More specifically, the disk controller 115 makes the OPU 120 firstly record a test signal on the disk, while changing the recording power in a plurality of steps. Subsequently, the disk controller 115 makes the OPU 120 reproduce the recorded trial data to obtain the reproduced data of every recording power, and evaluates the signal quality. When evaluating such a signal quality as has been obtained in a reproducing period, the disk controller 115 uses, for instance, an asymmetry ($\beta$ value) which shows the symmetry of an amplitude of the reproduced signal, a jitter value which shows the fluctuation of the edge, an error rate which shows the reliability of the reproduced data or the like, as an indication. Thus, the value of the recording power which gives the best recording quality, in other words, the optimum recording power is determined (S100).

The determined optimum recording power (Po) is stored in a predetermined register. At the same time, the condition such as the time and the temperature at which the Po has been determined is also retained as an attribute information (S101).

The disk controller 115 sets the optimum recording power therein which has been stored in the predetermined register, according to the direction of the upper command, and prepares for the recording onto the disk 101 (S102).

The disk controller 115 moves the OPU 120 to a predetermined position according to the direction of the upper command, and starts recording (S103).

The disk controller 115 completes recording when having reached the record-end address directed by the upper command, and sets the laser beam at the reproduction power (S104).

At the same time, the disk controller 115 makes the temperature sensor 108 in the inner part of the OPU 120 detect the temperature in the drive. The disk controller 115 stores the detected temperature t1 in the memory 117 of which is a storage unit.

Here, the disk controller 115 measures the temperature t1 immediately after having completed recording, but may measure the temperature t1 immediately before completing recording in S104 (S105). The disk controller 115 moves the OPU 120 by several tracks in such a direction that the record-end address in S104 becomes smaller, to reproduce a recorded portion (recorded region) which has been recorded immediately before the movement, and detects and evaluates the reproduced signal. In the present exemplary embodiment, the disk controller 115 detects the asymmetry (or $\beta$ value). The detected evaluation result is stored in the memory 117 (S106).

The LD power control circuit 111 turns off the LD/driver 105 in the OPU 120, and sets the LD/driver 105 at a pausing state (recording standby period) (S107).

When the recording of the data has been completed but the data is not stored in the memory 117 and the ejection of the disk or finalization has been required, the LD power control circuit 111 completes the laser power adjustment process (S108).

When the recording has been required by the direction of the upper command and the disk controller 115 has stored a predetermined amount of the data in the memory 117, the disk controller 115 sets the reproduction power in the LD/driver 105 of the OPU 120 through the LD power control circuit 111, and turns the light on. Subsequently, the disk controller 115 controls the focus and the track through the servo recording/reproducing processor 114, immediately before the OPU 120 restarts the recording. At the same time, the disk controller 115 makes the temperature sensor 108 in the inner part of the OPU 120 detect the temperature in the drive; and stores the detected temperature t2 in the memory 117 (S109).

As described above, by making the sensor detect t1 and t2 in the same condition of the reproduction state, the optical recording/reproducing apparatus can enhance the reliability of the temperature measurement.

Next, the disk controller 115 corrects a recording power, which is a feature of the present invention.

Here, the operation will be described with reference to an example of executing OPC to an organic dye type of a write-once disk while using an asymmetric value as an indication.

The recording power is corrected sequentially in two steps of S110 and S111.

In the first step S110, the recording power is corrected based on the last recording state in an intermittent recording.

In other words, the recording power is corrected based on the reproduced signal quality of the information which has been recorded immediately before the apparatus enters a pausing state.

In the next step S111, the recording power is corrected based on the change (temperature difference) of the temperature in the apparatus during a pausing state in the intermittent recording.

Firstly, in S110, the recording power is corrected based on the asymmetric value (or β value) which has been stored in the memory 117 in S106.

Figure 4:
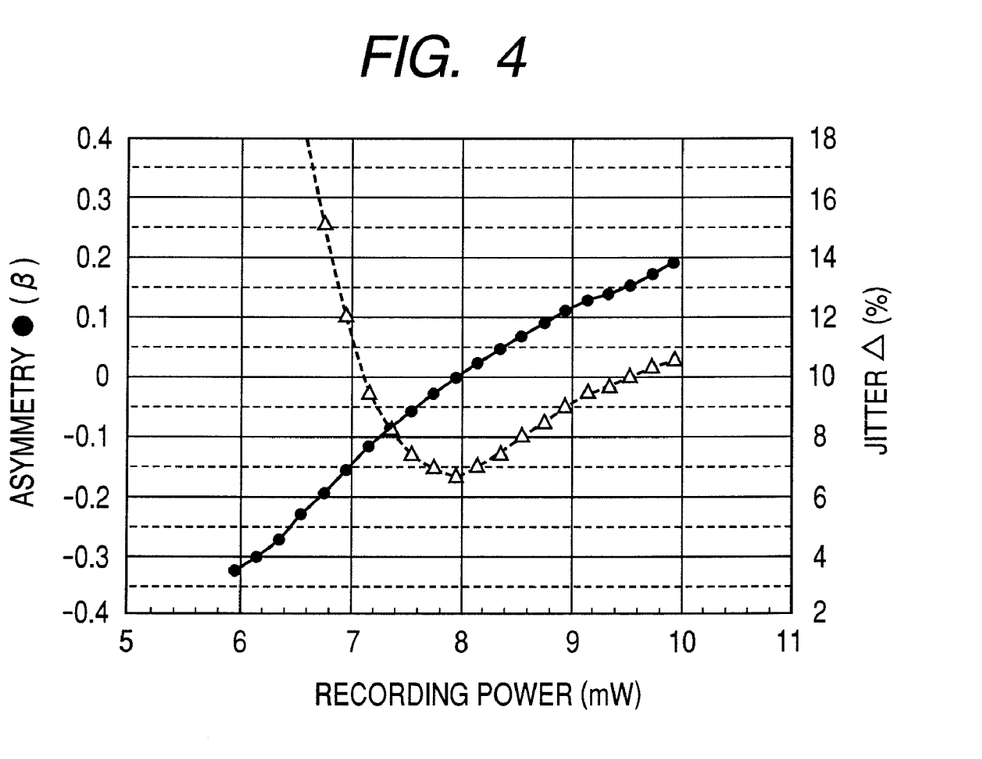
FIG. 4 is a view for illustrating a relationship between a recording power and asymmetry in an organic dye disk.

Here, the method for correcting the recording power by using the recording power dependency of the asymmetric value of the optical disk will now be described as an example. The relationship between the recording power and the asymmetric value is illustrated in FIG. 4. The horizontal axis represents a recording power (mW), and the vertical axis represents an asymmetric value. When the recording power changes to 9 mW from 8 mW, the asymmetric value changes to 0.10 from 0.00. In other words, the asymmetric value changes by 10% with respect to the power variation of 12.5%. Specifically, the present recording power may change by 1.25% in order to change the asymmetric value by 1%.

Here, suppose that the target asymmetric value of OPC in S100 is 0.00. In addition, suppose that the asymmetric value of the reproduced signal in S106 is 0.01. Then, the asymmetric value is 1% larger than the target asymmetric value, so that the recording power is corrected so as to be reduced by 1.25%.

By thus correcting the recording power, the deviation amount of the recording power is corrected, which has caused by the change of the parameter relating to the recording quality such as the change of the temperature, a radial tilt of the disk in recording or the like.

Here, the apparatus corrects the recording power while using the relationship between the asymmetric value and the recording power, but may employ a structure of correcting the recording power while using as a reference a parameter having some dependency on the recording power, such as a relationship between a jitter value and the recording power, a relationship between a modulation degree and the recording power, or the like. Alternatively, the apparatus may employ a structure of correcting the recording power while using a fixed value (S110).

Subsequently, in S111, the recording power obtained in S110 is corrected for the temperature change which has occurred in a pausing state (recording standby period).

Here, the method of adjusting the recording power with respect to the temperature change in the apparatus, which has occurred in a pausing state, will now be described below in detail.

Figure 5:
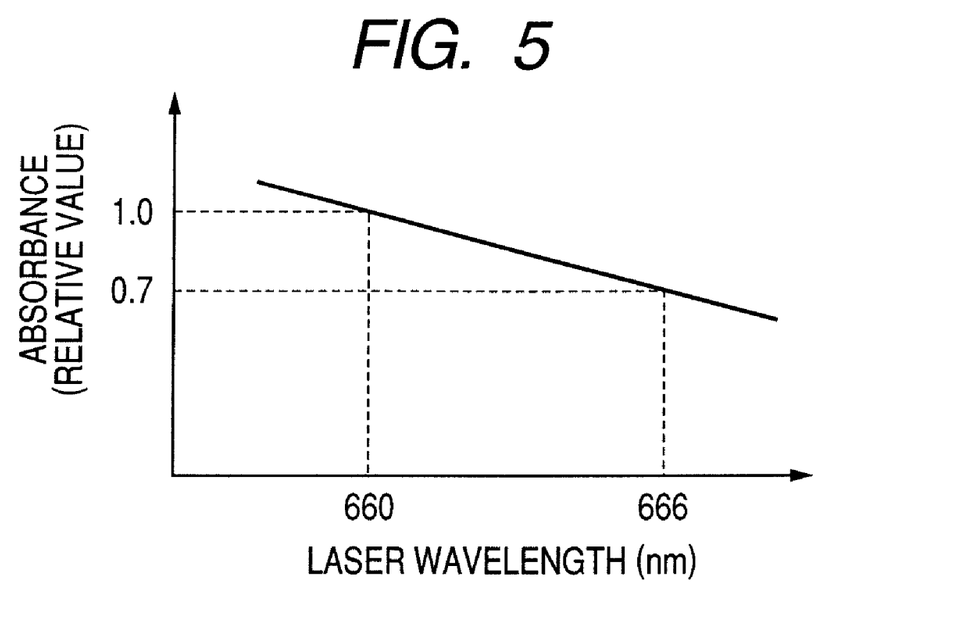
FIG. 5 is a view for describing a relationship between a laser wavelength and an absorbance (recording sensitivity) in an organic dye disk.

Firstly, the temperature change (temperature difference) $\Delta T$ (=t1−t2) in the apparatus is calculated from the detected result (t1 and t2) by the temperature sensor 108. A correction amount $\Delta P$ of the optimum recording power is determined with the use of the calculated value. Here, it is known that the temperature change in the apparatus causes the temperature change of an LD itself, and accordingly results in changing the wavelength of an emitted laser. For this reason, the relationship between the laser wavelength and the absorbance (Abs) by the disk 101 (organic-dye type of write-once type) is illustrated in FIG. 5. The absorbance changes with the change of the laser wavelength. The horizontal axis in FIG. 5 represents the laser wavelength, and the unit is nm. The vertical axis represents the absorbance, and represents the ratio of the absorbance to that in the reference wave length. FIG. 5 shows the characteristics in which the absorbance (equivalent to recording sensitivity) decreases by 5% per +1 nm of a wavelength change, when the reference wavelength is set at 660 nm. On the other hand, the LD generally has a temperature dependency of approximately +0.2 nm/° C. in the wavelength region. In other words, the change of the laser wavelength of 6 nm is equivalent to the change of the laser temperature of approximately 30° C. This means that the laser wavelength to be emitted from the LD varies due to the temperature change of the LD itself and that the recording sensitivity of the disk changes.

Figure 6:
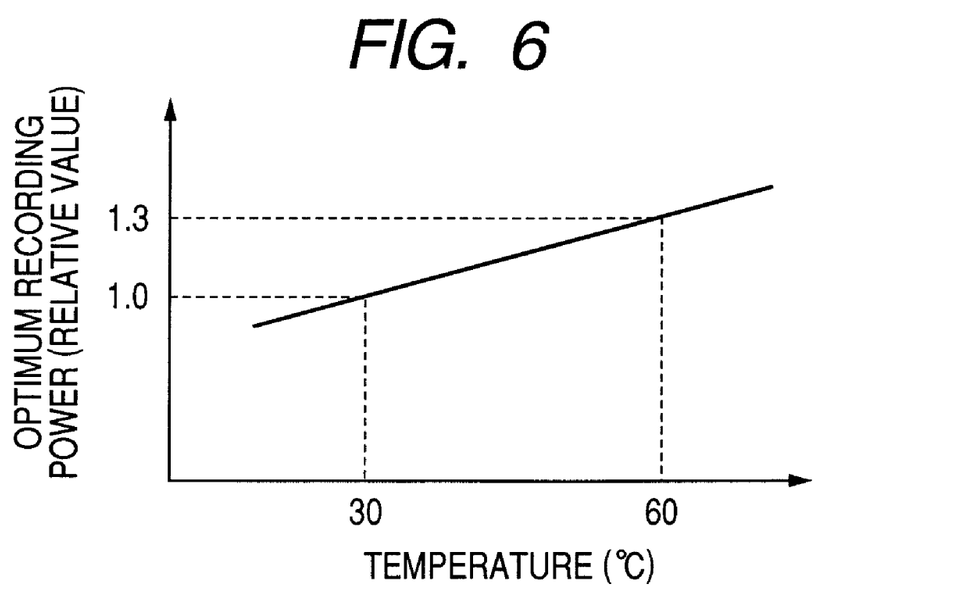
FIG. 6 is a view for describing a relationship between a laser temperature and the optimum recording power in an organic dye disk.

In FIG. 6, the horizontal axis represents a temperature in the apparatus, and the vertical axis represents a change amount (correction amount) of the optimum recording power, in a disk having the absorbance properties in FIG. 5. It is understood from FIG. 6 that the optimum recording power needs to be increased by approximately 30% ($\Delta P$) when the temperature in the apparatus changes by 30° C., for instance. This data for showing the correlation between the temperature and the optimum recording power is stored beforehand in a form of a table in the memory 117.

As described above, the apparatus corrects the recording power of an LD with respect to the change of the absorbance of the disk due to the shift of the laser wavelength caused by the temperature change $\Delta T$ in the apparatus with reference to the above described table. As a result, the apparatus can keep heat quantity to be absorbed in the disk constant even when the absorbance changes, and can form a mark having a desired shape and length. Thereby, the apparatus can record a data on the whole plane of the disk with a constant quality (S111).

As was described above, the reason of adjusting the recording power sequentially in S110 and S111 is because a method of correcting the recording power based on a temperature which has been detected immediately before restarting the recording action can more correctly reflect the influence of the temperature change. The apparatus may give S110 and S111 such a configuration as not to correct the recording power when the asymmetric value and the temperature change are small.

The data for showing the correlation between the temperature and the optimum recording power is different depending on the type of the optical disk, so that the table for showing the correlation between the temperature and the optimum recording power is preferably stored in the memory 117 for each type beforehand.

As was described above, an optical recording/reproducing apparatus according to the present invention corrects a recording power based on a signal quality of a reproduced signal obtained by reproducing a region which has been recorded immediately before the reproducing operation, and on the detected temperature in the apparatus, in an intermittent recording. Thereby, the apparatus can constantly set the optimum recording power even when the temperature largely changes in the recording standby period, and as a result, can record a data on the whole plane of the optical disk in a constant quality.

Furthermore, needless to say, the object of the present invention can be achieved even by supplying a recording medium storing a program code of software realizing the function of the above-mentioned embodiment in a system or an apparatus, and allowing a computer (or a CPU or an MPU) of the system or the apparatus to read the program code stored in the recording medium for execution.

In this case, the program code itself read from the recording medium realizes the function of the above-mentioned embodiment, and the program code itself and the recording medium storing the program code constitute the present invention.

As the recording medium for supplying a program code, for example, a flexible disk, a hard disk, an optical disk, a magnetooptical disk, a CD-ROM, a CD-R, a magnetic tape, a nonvolatile memory card, or a ROM can be used.

Furthermore, needless to say, by executing the program code read by the computer, the function of the above-mentioned embodiment can to realized, and also an OS (basic system or an operating system) operated on the computer performs partial or entire actual processing in accordance with an instruction of the program code, whereby the function of the above-mentioned embodiment can be realized by that processing.

Furthermore, needless to say, after the program code read from the recording medium is written in a memory provided in a function extension board inserted in a computer or a function extension unit connected to the computer, a CPU or the like provided in the function extension board or the function extension unit performs partial or entire actual processing in accordance with an instruction of the program code, whereby the function of the above-mentioned embodiment can be realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-043068, filed Feb. 25, 2008, which is hereby incorporated by reference herein in its entirety.

What is claimed is:

1. An optical recording/reproducing apparatus for intermittently recording information on an optical disk comprising:
    a light source that records information on an optical disk;
    a first sensor that reproduces information from a recorded portion and evaluates a signal quality of the reproduced information during a recording standby period in an intermittent recording process;
    a second sensor that detects a temperature in the apparatus; and
    a correction circuit that corrects a power of a laser beam emitted from the light source based on an evaluation result of the first sensor and the temperature in the apparatus detected by the second sensor,
    wherein the correction circuit corrects the power of the laser beam of the light source by performing a first correction and then a second correction sequentially:
        the first correction correcting the power of the laser beam of the light source based on the evaluation result of the signal quality of the reproduced information during a recording standby period in the intermittent recording process, and
        the second correction correcting the power of the laser beam corrected in the first correction based on a change in temperature in the apparatus detected during a recording standby period in the intermittent recording process.

2. The optical recording/reproducing apparatus according to claim 1, wherein the signal quality is evaluated based on one of an asymmetric value, a jitter value, and an error rate of a reproduced signal.

3. The optical recording/reproducing apparatus according to claim 1, wherein the change in temperature difference is a between a temperature that is detected immediately after a previous recording is completed and a temperature that is detected immediately before a new recording is restarted.

4. The optical recording/reproducing apparatus according to claim 1, wherein the change in temperature is a difference between a temperature that is detected immediately before a previous recording is completed and a temperature that is detected immediately before a new recording is restarted.

5. The optical recording/reproducing apparatus according to claim 1, further comprising a memory for storing a table that shows a correlation between temperature and recording power of a laser beam, for different types of optical disks.

* * * * *